(12) United States Patent
Kocznar et al.

(10) Patent No.: US 6,634,557 B2
(45) Date of Patent: Oct. 21, 2003

(54) MULTIDIRECTIONAL BARCODE READER

(75) Inventors: Wolfram Kocznar, Innsbruck (AT); Josef Fischer, Hallein (AT); Roman Wagner, Seekirchen (AT)

(73) Assignee: TeamAxess Ticketing GmbH, Koppl (AT)

( * ) Notice: Subject to any disclaimer, the term of this patent is extended or adjusted under 35 U.S.C. 154(b) by 0 days.

(21) Appl. No.: 09/946,844

(22) Filed: Sep. 5, 2001

(65) Prior Publication Data

US 2002/0070276 A1 Jun. 13, 2002

(30) Foreign Application Priority Data

Sep. 6, 2000 (AT) .......................................... 652/2000 U

(51) Int. Cl.[7] .................................................. G06K 7/10
(52) U.S. Cl. ................... 235/462.45; 235/486; 235/380
(58) Field of Search ............................ 235/462.45, 381, 235/386, 375, 492, 449, 493, 382, 382.5, 383, 385, 486; 705/12, 13, 14, 15, 41, 42, 20

(56) References Cited

U.S. PATENT DOCUMENTS

| 5,107,100 A | | 4/1992 | Shepard et al. |
| 5,130,520 A | | 7/1992 | Shepard et al. |
| 5,498,859 A | * | 3/1996 | Farmont ...................... 235/384 |
| RE37,166 E | * | 5/2001 | Rando et al. .......... 235/462.36 |
| 6,340,115 B1 | * | 1/2002 | Swartz .................. 235/462.45 |
| 6,412,692 B1 | * | 7/2002 | Miyagawa .................. 235/382 |

FOREIGN PATENT DOCUMENTS

| EP | 0 698 854 A | 2/1996 |
| WO | WO 88 02893 A | 4/1988 |
| WO | WO 95 22118 A | 8/1995 |

* cited by examiner

*Primary Examiner*—Thien M. Le
(74) *Attorney, Agent, or Firm*—Henry M. Feiereisen

(57) ABSTRACT

In a device for access control, the authorizations are stored on tickets in the form of a barcode. A reader unit is connected to an evaluating unit and controls devices that signal and/or block access. The reader unit has an insertion zone for a ticket wherein the insertion zone is larger than a ticket dimension. A multidirectional laser scanner scans the entire insertion zone in several lines oriented at an oblique angle relative to one another. The device can be used with different ticket formats such as air-travel tickets and check cards.

10 Claims, 2 Drawing Sheets

MULTIDIRECTIONAL BARCODE READER

The invention relates to a device for access control, with authorisations being stored on a ticket in form of a barcode, with a reader unit which is connected to an evaluation unit which optionally triggers signalling means and/or blocking means for an access.

Devices for the access control of persons have become known for ski-lifts and cable cars as well as for other places with public access. Such devices are also used in buildings whose access is reserved to a certain circle of persons. Usually, access is organised in form of access tracks which allow the passage of one person each. Within such access tracks there is a blocking apparatus which is frequently arranged as a pivot barrier. The pivot barrier is released after the performed check of the access authorisation.

The known systems mostly use tickets in the cheque-card format, with a barcode being printed on one of the narrow sides of the ticket which contains the access authorisation information. This ticket must be inserted with the barcode facing forward into the card orifice of the reader unit. Within the card orifice there is disposed a barcode scanner which scans a list rectangularly to the direction of insertion. If during the inserting process the barcode is read by the scanner, the information can be evaluated and, depending on the same, a signal can be issued.

Reader units have also become known which are provided with a motive draw-in for the ticket. In this case barcodes are used which are printed on the tickets in the longitudinal direction of the ticket and are read by means of laser diodes.

The invention has the object of avoiding the disadvantage of the known systems in that the insertion of the ticket is very difficult and time-consuming. In order to secure a reliable reading of the barcode, the card orifice must correspond very precisely to the dimensions of the ticket in the known systems. It is accordingly difficult to meet the insertion slot. Moreover, the invention is based on the finding that the possibility of using different ticket formats substantially facilitates the application of automatic access controls.

The invention provides that the reader unit is provided with an insertion zone for tickets which is dimensioned larger than the ticket format and that the reader unit comprises a multidirectional laser scanner which scans through a window the entire insertion zone in several lines which stand at an angle to one another.

Such an arrangement allows especially using tickets both in the format of air-travel tickets as well as such in the format of cheque cards when the insertion zone is arranged as a V-shaped card orifice with a clearance of more than 80 millimeters. If the insertion zone is arranged as V-shaped card orifice which is provided in the upper enclosing wall with a transparent window and if a multidirectional laser scanner is arranged above said window, the barcode will also be read independent of the ticket's position in the case that the ticket is positioned in an inclined manner.

When the pivot barrier is provided in the known manner with two blocking means which form on either side of the pivot barrier an access each, the first reader unit can be used for entrance access and a second reader unit for exit purposes.

BRIEF DESCRIPTION OF THE DRAWINGS

The invention is now explained in closer detail by reference to the following embodiment.

DETAILED DESCRIPTION OF PREFERRED EMBODIMENTS

Figure 1:
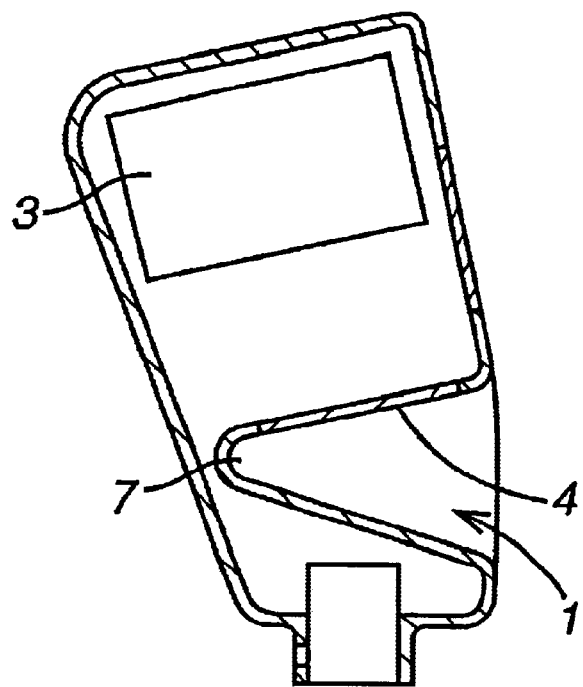
FIG. 1 shows schematically a cross-sectional view of a reader unit.

FIG. 1 shows a schematic cross-sectional view of the reader unit. The insertion zone 1 for tickets is arranged as a largely dimensioned ticket opening 7 with a V-shaped cross section. A window 4 is formed in the upper wall of the ticket opening 7. A multidirectional laser scanner 3 is arranged above said window 4.

Figure 2:
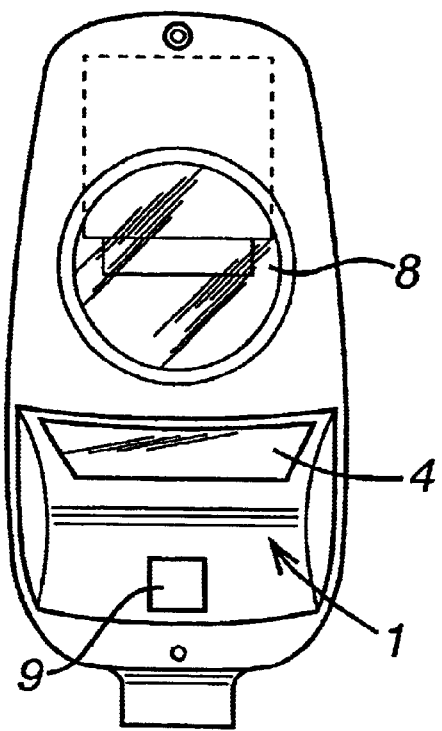
FIG. 2 shows schematically a front view of the reader unit of FIG. 1.

FIG. 2 shows the front view of said reader unit. A signal lamp 8 is disposed above the card orifice 7, which light symbolises the release or blockage of the access. A sensor 9 for recognising fingerprints is incorporated in the lower wall of ticket opening 7.

Figure 4:
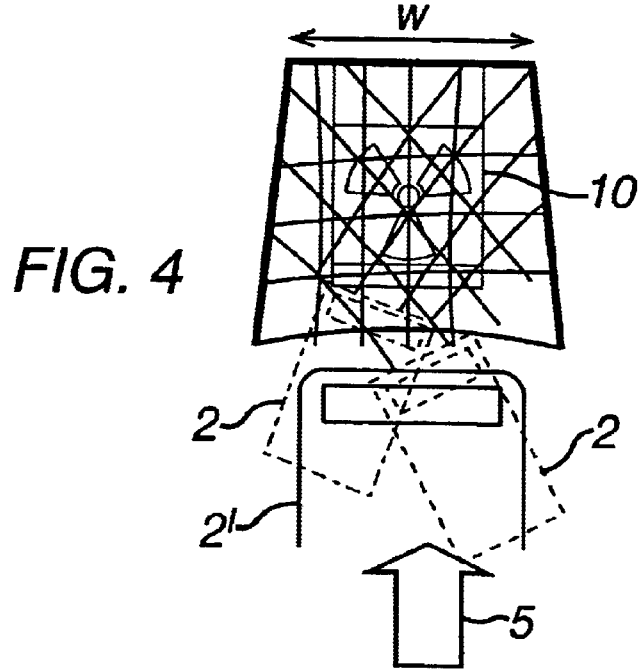
FIG. 4 depicts schematically the operation of the reader unit.

FIG. 4 explains the function of the reader unit. One recognises that the ticket opening 7 is also provided with a V-shaped arrangement in the insertion zone of the tickets 2. The laser scanner 3 scans the entire insertion zone for tickets 2 in several lines 10, with the lines 10 extending rectangularly to the direction of insertion 5 and at an acute angle thereto.

A barcode present on tickets 2 can be read reliably, irrespective of whether the ticket 2, 2' is positioned straight or inclined and whether the ticket fills out the insertion zone or is substantially smaller than the same.

Figure 3:
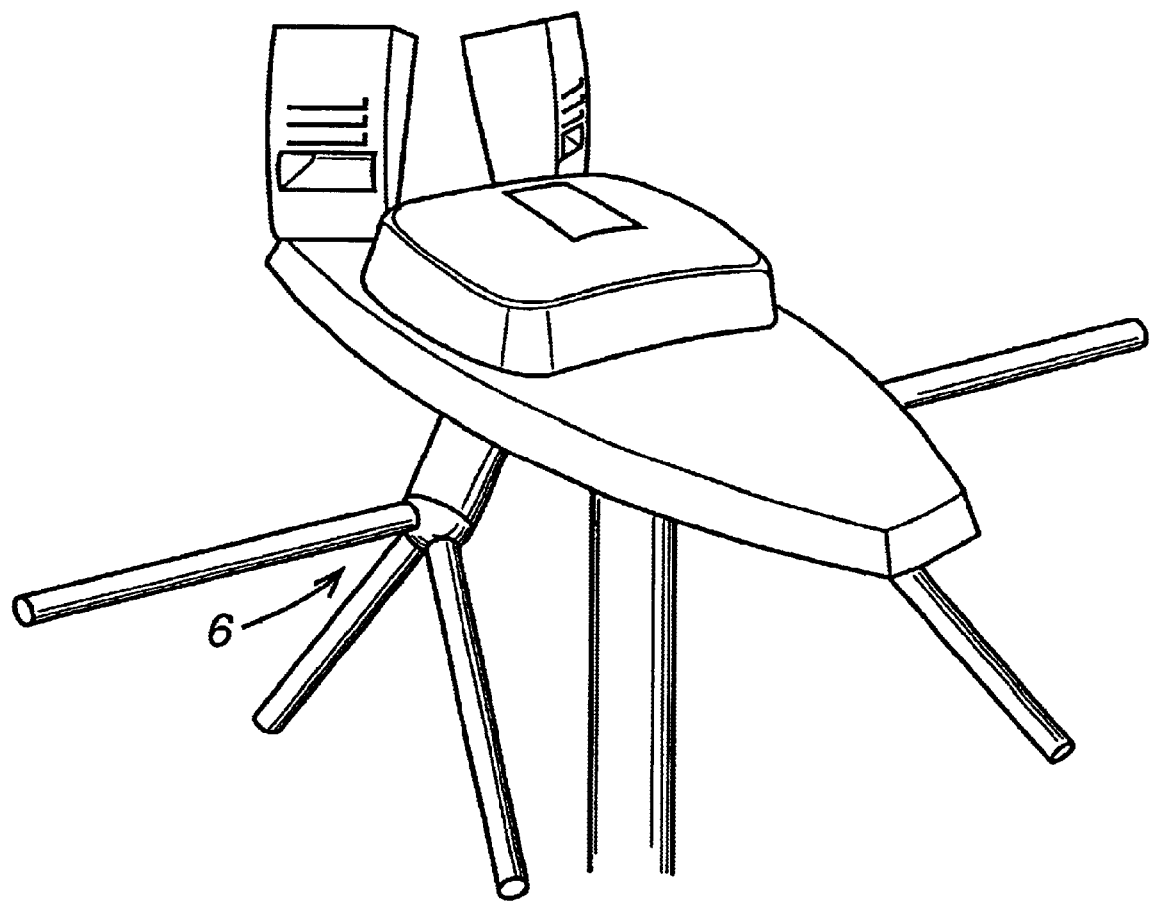
FIG. 3 depicts an access barrier used with the reader unit.

FIG. 3 shows a pivot barrier 2 as it is used with the reader unit for example. When a person with access authorisation holds his or her ticket into the insertion zone, the barcode is read immediately and irrespective of the position of the ticket 2. No special requirements are placed on the ticket 2, neither concerning the material nor concerning the format. Tickets in the format of an air-travel ticket as well as such of cheque-card format can be used with ease. Even tickets of normal paper as are used today for mere visual check can be processed by this system.

This is particularly advantageous when automatic access control systems are to be combined with classical prepaid networks. Thus it is possible to issue a normal paper ticket by the ticket issuer without any special technical requirements, with a reservation number in form of a barcode being printed on said ticket. This number is then transferred to an evaluation unit and is used as a deciding criterion for the access once the ticket-holder inserts his or her ticket into the insertion zone.

Since the insertion zone is dimensioned relatively generously, a sensor 9 for a fingerprint can be integrated in the lower wall of the ticket opening. An identity check can thus be enabled when the evaluating unit has information on the fingerprint.

Furthermore, the lower wall of the ticket opening 7 can be provided with mirrors. This allows reading tickets with a downwardly facing barcode.

What is claimed is:

1. A device for access control based on an access authorization code being stored on a ticket in the form of a barcode, comprising:

a reader unit adapted to read the access authorization code, the reader unit including a multi-directional laser scanner which scans along several scan lines oriented at an oblique angle relative to one another, an evaluation unit connected to the reader unit and evaluating a validity of the access authorization code to provide an access control signal, and blocking means blocking access based on the access control signal, wherein the reader unit is provided with an insertion zone for the ticket that is larger than a linear dimension of the ticket and wherein the multi-directional laser scanner scans the entire insertion zone.

2. The device of claim 1, wherein the insertion zone includes a V-shaped or U-shaped opening adapted to receive the ticket.

3. The device of claim 2, wherein the opening has an upper wall and a transparent window disposed in the upper wall, with the multi-directional laser scanner being disposed above said window.

4. The device of claim 2, wherein the opening has a lower wall and a fingerprint sensor being incorporated in the lower wall.

5. The device of claim 3, wherein the opening further includes a lower wall provided with a mirror.

6. The device of claim 3, wherein at least two of the several scan lines are non-overlapping and oriented perpendicular to an insertion direction of the tickets.

7. The device of claim 1, wherein the blocking means are implemented in the form of a pivot barrier having a passage direction, and wherein the reader unit is formed as a module and disposed after a pivot support of the pivot barrier as seen in the passage direction.

8. The device of claim 1, wherein the blocking means include two reader units, with a first reader unit adapted to read an entrance access authorization code and a second reader unit adapted to read an exit access authorization code.

9. The device of claim 2, wherein the ticket opening has a width of more than 80 mm.

10. A device for access control based on an access authorization code being stored on a ticket in the form of a barcode, comprising:

a reader unit adapted to read the access authorization code, the reader unit including a multi-directional laser scanner which scans along several scan lines oriented at an oblique angle relative to one another;

an evaluation unit connected to the reader unit and evaluating a validity of the access authorization code to provide an access control signal; and at least one of a signaling means and blocking means providing access based on the access control signal, wherein the reader unit is provided with an insertion zone for the ticket having a V-shaped or U-shaped opening that is larger than a linear dimension of the ticket and wherein the multi-directional laser scanner scans the entire insertion zone.

* * * * *